US011396620B2

(12) United States Patent
Wagle et al.

(10) Patent No.: US 11,396,620 B2
(45) Date of Patent: *Jul. 26, 2022

(54) EPOXIDIZED ALPHA OLEFIN BASED ANTI-BIT BALLING ADDITIVE FOR WATER-BASED DRILLING FLUIDS

(71) Applicant: SAUDI ARABIAN OIL COMPANY, Dhahran (SA)

(72) Inventors: Vikrant Wagle, Dhahran (SA); Jothibasu Ramasamy, Dhahran (SA); Abdullah S. Al-Yami, Dhahran (SA); Sara Alkhalaf, Alkhobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,454

(22) Filed: Jul. 30, 2020

(65) Prior Publication Data

US 2022/0033701 A1 Feb. 3, 2022

(51) Int. Cl.
*C09K 8/12* (2006.01)

(52) U.S. Cl.
CPC ............ *C09K 8/12* (2013.01); *C09K 2208/34* (2013.01)

(58) Field of Classification Search
None
See application file for complete search history.

(56) References Cited

U.S. PATENT DOCUMENTS 3,761,410 A 9/1973 Mondshine et al.
4,943,383 A 7/1990 Avery et al.
5,403,822 A 4/1995 Mueller et al.
5,945,386 A 8/1999 Alonso-Debolt et al.
6,596,670 B1 7/2003 Mueller et al.
7,384,892 B2 6/2008 Melbouci et al.
7,786,052 B2 8/2010 Ballard
11,214,724 B1 * 1/2022 Wagle .................. E21B 21/003
2005/0199428 A1 * 9/2005 Dixon ...................... C09K 8/04 175/65
2007/0287640 A1 * 12/2007 Ballard .................... C09K 8/32 507/219
2012/0095167 A1 * 4/2012 Nagai .................. C08G 65/329 525/91
2015/0285051 A1 * 10/2015 Miller ................ E21B 43/2408 166/272.3
2016/0102237 A1 * 4/2016 Pober ...................... E21B 43/16 507/136
2018/0187065 A1 * 7/2018 Mirzaei .............. C08B 37/0087
2018/0223160 A1 8/2018 Al-Yami et al.

FOREIGN PATENT DOCUMENTS

CN 110804169 A 2/2020
EP 0612835 A2 8/1994
EP 0673984 A1 9/1995
EP 0931828 A2 7/1999
WO 9010682 A1 9/1990
WO 2019173061 A1 9/2019

OTHER PUBLICATIONS

Kania, Dina et al., "A review of biolubricants in drilling fluids: Recent research, performance, and applications", Journal of Petroleum Science and Engineering, ScienceDirect, Elsevier B.V. vol. 135, Sep. 2015, pp. 177-184 (8 pages).
"Vikopol", Product Page, Arkema Worldwide, Date Accessed: Jul. 29, 2020, URL: <http://www.arkemaepoxides.com/en/epoxides/product-viewer/Vikopol/> (2 pages).
International Search Report and Written Opinion issued in Application No. PCT/US2020/052094, dated Apr. 22, 2021 (14 pages).

* cited by examiner

*Primary Examiner* — Angela M DiTrani Leff
(74) *Attorney, Agent, or Firm* — Osha Bergman Watanabe & Burton LLP

(57) ABSTRACT

Drilling fluid compositions and methods for using drilling fluid compositions are provided with enhanced anti-bit balling properties that include an aqueous-based fluid, one or more drilling fluid additives, and an anti-bit balling additive. The anti-bit balling additive may be an epoxidized α-olefin and the drilling fluid may include the anti-bit balling additive in an amount ranging from about 0.5 ppb to about 20 ppb. Methods for using the drilling fluid compositions may further include mixing an aqueous base fluid with one or more drilling fluid additives and an anti-bit balling additive, wherein the anti-bit balling additive includes epoxidized α-olefin and the drilling fluid may include the anti-bit balling additive in an amount ranging from about 0.5 ppb to about 20 ppb, and introducing the drilling fluid to a subterranean formation.

20 Claims, No Drawings

EPOXIDIZED ALPHA OLEFIN BASED ANTI-BIT BALLING ADDITIVE FOR WATER-BASED DRILLING FLUIDS

FIELD OF THE DISCLOSURE

Embodiments of the present disclosure generally relate to drilling fluid compositions and methods for drilling oil wells.

BACKGROUND

In the oil drilling industry, bit balling refers to a buildup of cuttings from shale formations that may adhere to a drill bit. Drill "cuttings" are broken bits of solid materials produced as rock is broken apart. Cuttings must be continuously removed from the borehole during drilling.

Bit balling may occur at almost any time. Bit balling results in a reduction in the rate of penetration, reduced surface torque of the drill bit, and an increase in stand pipe pressure. As clay or shale accumulates on the bit and the effect of bit balling increases, drilling will slow and eventually may need to be stopped in order for the drill bit to be cleaned before proceeding.

BRIEF SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed here relate to drilling fluid compositions that include an aqueous-based fluid, one or more drilling fluid additives, and an anti-bit balling additive. The anti-bit balling additive may be an epoxidized α-olefin and the drilling fluid may include the anti-bit balling additive in an amount ranging from about 0.5 ppb (pounds per barrel) to about 20 ppb.

In a further aspect, embodiments disclosed here relate to methods for using drilling fluids. The methods include introducing an aqueous-based fluid and an anti-bit balling additive with one or more optional drilling fluid additives into a wellbore. The anti-bit balling additive may include an epoxidized α-olefin and the drilling fluid may include the anti-bit balling additive in an amount ranging from about 0.5 ppb (pounds per barrel) to about 20 ppb.

In another aspect, embodiments disclosed here relate to methods for making a drilling fluid. The methods include mixing an aqueous base fluid with an anti-bit balling additive where the anti-bit balling additive is an epoxidized α-olefin. The drilling fluid may include the anti-bit balling additive in an amount ranging from about 0.5 ppb to about 20 ppb.

DETAILED DESCRIPTION

Conventional additives or coatings may be used to attempt to control bit balling tendencies. Most additives, however, require an oil phase in the drilling fluid or require an emulsified drilling fluid to be effective. The oil phase in the fluid provides proper lubrication necessary for the additives to function. Moreover, some additives may require a particular pH range and cloud point range to be compatible with the drilling fluids used. However, the efficacy of conventional additives and coatings is lacking, often requiring the drill to be frequently removed and cleaned before drilling can proceed.

In particular, the present disclosure relates to drilling fluid compositions and methods including epoxidized α-olefin anti-bit balling drilling fluid additives. Embodiments in accordance with the present disclosure generally relate to methods and compositions of an anti-bit balling drilling fluid. Epoxidized α-olefin may be used as a water based drilling fluid additive to reduce bit balling without the need to use a drilling fluid containing an oil phase or emulsified drilling fluid. The epoxidized α-olefin anti-bit balling drilling fluid additive may also replace conventionally used surfactants. The epoxidized α-olefin may provide a suitable non-foaming and biodegradable substitute that is effective in reducing the accretion of drilling fluid particulates.

As a non-limiting example, the anti-bit balling drilling fluids of the present disclosure may be used in the oil and gas drilling industries, such as for drilling in oil and gas wells. Oil and gas wells may be formed in subterranean formations. A subterranean formation or material can be any section of a wellbore and any section of a subterranean petroleum- or water-producing formation or region in fluid contact with the wellbore. The wellbore may serve to convey natural resources, such as hydrocarbons, to the surface.

To drill a subterranean well or wellbore, a drill string, which may include a drill bit and drill collars to weight the drill bit, is introduced into a predrilled hole. Rotation of the drill string or of just the bit causes the drill bit to cut into the rock at the face of the wellbore, producing rock cuttings. The term "rock cuttings" is intended to include any fragments, pieces, or particulates separated from the formation by the drill bit or otherwise present in the wellbore.

A drilling fluid, also known as a drilling mud or simply "mud," is a specially designed fluid that is introduced into a wellbore as the wellbore is being drilled to facilitate the drilling operation. The drilling fluid can carry cuttings up from beneath and around the bit, transport them up the annulus, and allow their separation at the surface. Also, the drilling fluid may cool the drill bit. The drilling fluid can aid in support of the drill pipe and drill head. The drilling fluid can provide a hydrostatic head to maintain the integrity of the wellbore walls and prevent well blowouts.

The drilling fluid may also lift the rock cuttings away from the drill bit and uphole as the drilling fluid is recirculated back to the surface. The drilling fluid may transport rock cuttings from the drill bit to the surface, which can be referred to as "cleaning" the wellbore. The rock or drill cuttings are broken bits of solid materials produced as rock is broken apart that are continuously removed from the borehole during drilling. The cuttings may vary based on the drilling application, and in some instances may include clay (shale), rock, sand, minerals, and dirt pieces. These pieces often begin to agglomerate, forming a dense slurry that may build up on the drill bit. The increasing use of water-based drilling fluids aggravates bit balling problems as water from the drilling fluid may be absorbed by the cuttings, exacerbating their tendency to adhere to the drill bit.

Clay may be classified based on the Attenberg limits, which differentiate three phases of clay-based on water content: the liquid limit, plastic limit, and plastic index. The liquid limit is the threshold moisture content at which the clay is so saturated with moisture that it begins to wash away in an almost-liquid form. Clay at its liquid limit is a muddy liquid that is easily washed from a drill bit. The plastic index of clay refers to the least moisture content at which the clay may be rolled into threads one eighth of an inch in diameter without breaking into pieces. Plastic index clay does not contain much moisture and is in an almost-solid form. Clay at its plastic index is easily brushed away from the drill bit as chalky residue and is not generally problematic.

Clay cuttings may be particularly susceptible to cause bit balling problems due to the plastic limit of clay. The plastic limit of clay refers to the state between the liquid limit and the plastic index in which the clay contains enough water to impart stickiness to the clay without adding so much water that the clay forms a liquid. This plastic limit may also be referred to as the "danger zone" of the clay due to the problems caused by the thick nature and sticky texture of the clay. Clay at the plastic limit is often a viscous, gummy slurry that is difficult to manipulate.

The present disclosure is directed to drilling compositions and methods that may further include epoxidized α-olefin based anti-bit balling additives for water-based drilling fluids. "Bit balling" refers to the accumulation and adherence of cuttings on the drill bit, which slow and even stop the drill bit from properly performing. The drilling fluid compositions of one or more embodiments may serve several functions in the drilling process. The drilling fluid compositions provide an anti-bit balling coating and cooling to the drill bit. According to embodiments, the drilling fluid compositions also aid with cleaning the wellbore by transporting rock cuttings from the drill bit to the surface. Additionally, the epoxidized α-olefin anti-bit balling additive may be effective in reducing the percent (%) accretion substantially. In some embodiments, the epoxidized α-olefin of the anti-bit balling drilling fluid additive may further aid in eliminating issues such as stuck pipe. Reduced relative rates of penetration (ROPs) are associated with and often result bit-balling and cuttings accretion.

In one or more embodiments, the epoxidized α-olefin may be prepared by converting α-olefins into 1,2 epoxides. In such a method, the α-olefins are converted via addition of hypochlorous acid. After addition of the acid, the resultant is treated with a base to prepare the epoxidized α-olefin. Epoxidized α-olefins may also be prepared by treatment with peroxy acid (peracids). Epoxidized α-olefins may also be prepared via reaction of an α-olefin with peroxides or alkyl peroxides, such as t-butylhydroperoxide, and a molybdenum catalyst or an acid, such as acetic or formic acid. In embodiments of the method of forming the epoxidized α-olefin, the α-olefin may be selected from α-olefins having carbon atoms numbering in a range from 6 to 40 and combinations thereof, where any lower limit may be combined with any mathematically feasible upper limit. In some embodiments, the α-olefin is in a range of from 10 to 24 carbon atoms, and combinations thereof. In other embodiments, the α-olefin may range of from 12 to 18 carbon atoms, and combination thereof. The α-olefin may be linear, branched or unbranched, substituted or unsubstituted, and combinations thereof.

In one or more embodiments, the produced epoxidized α-olefins of anti-bit balling drilling fluid additive may be of the general structure shown in Formula I:

Formula (I)

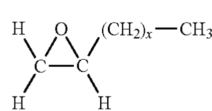

where (x) may be 1 to 40. In some embodiments, x may be 1, 3, 5, 7, 9, 11, 13, 15, 17, 19, 21, 23, 25, 27, 29, 31, 33, 35, 37, and 39, and combinations thereof. In other embodiments, x may be 2, 4, 6, 8, 10, 12, 14, 16, 18, 20, 22, 24, 26, 28, 30, 32, 34, 36, 38, and 40, and combinations thereof. In one or more embodiments, x may be 5 to 17. In some embodiments, x may be from 5 to 15. Useful epoxidized α-olefins may include materials available under the product name Vikolox® Epoxidized Alpha Olefins from Arkema, Inc. (King of Prussia, Pa.). The anti-bit balling drilling fluid additive may generally be used in aqueous drilling fluid compositions and methods up to temperatures of about 300° F.

In embodiments of the drilling fluid composition, the composition may include an aqueous base fluid, an epoxidized α-olefin anti-bit balling additive, and, optionally, one or more other additives.

The drilling fluid includes an aqueous-base fluid. The aqueous-based fluid includes water. The water may be distilled water, deionized water, tap water, fresh water, production water, formation water, natural and synthetic brines, brackish water, natural and synthetic sea water, and other waters suitable for use in a wellbore environment. In some embodiments, the water used may naturally contain contaminants, such as salts, ions, minerals, or organics, and combinations thereof, as long as the contaminants do not interfere with the operation of the drilling fluid.

The aqueous-based fluid may contain from 50 wt % (weight percent) to 97 wt % water. In one or more embodiments, the aqueous-based fluid may comprise greater than 70 wt % water based on the total weight of the drilling fluid.

In some instances, the water used for the aqueous-based fluid will already have a certain level of salts or ions from natural sources, such as from production water, seawater, and brines. In other instances, salts and ions are added to the water used to increase the concentration of a salt or ion in the water so as to effect certain properties, such as density, of the drilling fluid or to handle the swelling of clays that come into contact with the drilling fluid. Without being bound by any particular theory, increasing the saturation of water by increasing the salt concentration or the level of other organic compounds in the water may increase the density of the water, and thus, the drilling fluid. Suitable salts may include, but are not limited to, alkali metal halides, such as chlorides, hydroxides, or carboxylates. In some embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any particular theory, brines may be used to create osmotic balance between the drilling fluid and portions of the subterranean formation.

In one or more embodiments, the aqueous-based fluid may comprise one or more salts in an amount that ranges from about 1 to about 300 ppb (pounds per barrel). For example, the drilling fluid may contain the one or more salts in an amount ranging from a lower limit of any of 1, 10, 50, 80, 100, 120, 150, 180, 200, 250 and 280 ppb to an upper limit of any of 30, 50, 70, 100, 120, 150, 180, 200, 220, 240, 260, 280 and 300 ppb, where any lower limit can be used in combination with any mathematically-compatible upper limit.

Embodiments of the drilling fluid include an epoxidized α-olefin anti-bit balling drilling fluid additive. The epoxidized α-olefin anti-bit balling drilling fluid additive may be used to inhibit or prevent accretion and agglomeration tendencies of any aqueous-based drilling fluid, to mitigate issues such as stuck pipe and lower ROPs. The amount of anti-bit balling drilling fluid additive included in the drilling fluid may be an amount that is sufficient to reduce accretion and agglomeration of the drilling fluid. Without being bound by any particular theory, the epoxidized α-olefin anti-bit balling drilling fluid additive may form a coating around the bit, further mitigating the adherence of clay or agglomerates onto the surface of the bit. The epoxidized α-olefin may limit bit balling of the drill bit without requiring the use of an oil phase drilling fluid or use of an emulsified drilling fluid.

In one or more embodiments of the present disclosure, the anti-bit balling additive may be included in the drilling fluids in an amount that ranges from 0.1, 0.5, 1.0, 2.0, 3.0, 4.0, 5.0 and 6.0 percent by weight (wt %) to 0.5, 1.0, 2.0, 3.0, 4.0, 5.0, 6.0 and 7.0 wt % of the drilling fluid composition, where any lower limit may be combined with any mathematically feasible upper limit. Alternatively, in some embodiments, the drilling fluid may contain from 0.05, 1, 1.5, 2.0, 2.5, 3.0, 3.5, 4.0, 4.5, 5.0, 6, 7, 8, 9, and 10 ppb to 1.0, 2.0, 3.0, 4.0, 5.0, 6.0, 8.0, 10, 12, 14, 16, 18, and 20 ppb of the anti-bit balling drilling fluid additive, where any lower limit may be combined with any mathematically feasible upper limit.

In embodiments of the drilling fluid, the epoxidized α-olefin anti-bit balling drilling fluid additive may reduce the tendency for bit-balling to occur on a drill bit. The tendency for cuttings to accumulate may be referred to as the accretion percentage, or the percentage of growth of the cuttings (or other components) to accumulate on the drill bit. In some particular applications, it may be desirable to maintain an accretion percentage of less than or equal to 20% to ensure optimal drilling conditions. In some embodiments the drilling fluid of the present embodiments may produce an accretion percentage of less than or equal to 20%, such as less than or equal to 18%, less than or equal to 16%, such as less than or equal to 15%, less than or equal to 14%, less than or equal to 12%, less than or equal to 10%, less than or equal to 5%, or less than or equal to 4%.

In addition, the drilling fluid exhibits a minimal amount or tendency to foam versus when a surfactant is added to a similar drilling fluid composition. When "similar drilling fluid" is referred to in this specification, it means a comparison is being made to an equivalent composition in all other aspects but for the substitution of the specified component or omission thereof.

Optionally, in some embodiments, the drilling fluid may also contain an additive. One or more additives may be any additives known to be suitable for drilling fluids. For example, in one or more embodiments, the drilling fluid may comprise one or more additional additives, such as weighting agents, fluid loss control agents, lost circulation control agents, defoamers, rheology modifiers (or viscosifiers), an alkali reserve, specialty additives, pH adjuster, shale inhibitors, and combinations thereof. One or more additives may be incorporated into the drilling fluid to enhance one or more characteristics of the drilling fluid. In some embodiments, however, the drilling fluid may include anti-bit balling additives according to embodiments without the need to add defoamers, as embodiments may result in stable drilling fluids that do not contain an oil phase or are not emulsions. One of ordinary skill in the art will, with the benefit of this disclosure, appreciate that the inclusion of a particular additive will depend upon the desired application and properties of a given wellbore fluid.

In one or more embodiments, the drilling fluid may contain from about 0.01 wt % to about 30 wt % of the one or more additives, based on the weight of the drilling fluid. In one or more embodiments, the drilling fluid may contain from 0.1, 0.5, 1.0, 1.5, 2.0, 2.5, 3.0, 4.0, 5.0, 6.0, 7.0, 8.0 10, 12, 14, and 16 wt % to 2.0, 2.5, 3.0, 3.5, 4.0, 5.0, 6.0, 7.0, 8.0, 10, 12, 14, 18, 20, 23, 25 and 30 wt % of the one or more additives, based on the weight of the drilling fluid, where any lower limit may be combined with any mathematically feasible upper limit.

In one or more embodiments, the drilling fluid may comprise one or more weighting agents. In some embodiments, the weighting agents may be selected from, for instance, calcium carbonate ($CaCO_3$), barium sulfate (barite), hematite ($Fe_2O_3$), siderite, or ilmenite, or other weighting agents, and combinations thereof. In some embodiments, the drilling fluid may include calcium carbonate as the weighting agent. Without being bound by any particular theory, use of a weighting agents may increase the density for modifying drilling fluid performance.

The drilling fluid composition may include a weight percent of weighting material sufficient to increase the density of the drilling fluid composition to allow the drilling fluid composition to support the wellbore walls and prevent fluids in downhole formations from flowing into the wellbore. The drilling fluid may contain from about 0.01 wt % to about 20 wt % of the weighting agents, based on the weight of the drilling fluid. In one or more embodiments the drilling fluid may contain from 1, 3, 5, 7, 9, 10, 12, 14 and 15 wt % to 12, 14, 16, 17, 18, 19 and 20 wt % of the weighting agent component based on the total weight of the drilling fluid, where any lower limit may be combined with any mathematically feasible upper limit.

The drilling fluid may contain weighting agents in an amount ranging from about 1 ppb to about 700 ppb, such as from 1 ppb to 700 ppb, or 10 to 650 ppb. In some embodiments, the drilling fluid may contain weighting agents in an amount ranging from 50 ppb to 700 ppb, from 100 ppb to 600 ppb, or from 200 ppb to 500 ppb.

In some embodiments, the drilling fluid may have a density of from about 62 pounds of mass per cubic foot (pcf) to about 170 pcf, as measured using Fann Model 140 Mud Balance according to ASTM Standard D4380. For instance, the drilling fluid may have a density of from 63 pcf to 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, or from 70 pcf to 100 pcf. The drilling fluid may have a density that is greater than or equal to 62 pcf, greater than or equal to 70 pcf, or greater than or equal to 100 pcf. In some embodiments, the drilling fluid may have a density of from 120 pcf to 160 pcf.

One or more additives may be incorporated into the drilling fluid to enhance one or more characteristics of the drilling fluid. For example, a viscosifier may be added to the drilling fluid to impart non-Newtonian fluid rheology to the drilling fluid to facilitate lifting and conveying rock cuttings to the surface of the wellbore. Examples of viscosifiers may include, but are not limited to, bentonite, montmorillonite clay, kaolin, ($Al_2Si_2O_5(OH)_4$ or kaolinite), polyacrylamide, polyanionic cellulose (PAC-R™, commercially available from M-I SWACO, Houston Tex.), and combinations of these. In some embodiments, the drilling fluid may include xanthan gum, a polysaccharide commonly referred to as XC polymer (commercially available from M-I SWACO, Houston Tex.). The XC polymer may be added to the water-based drilling fluid to produce a flat velocity profile of the water-based drilling fluid in annular flow, which may help to improve the efficiency of the drilling fluid, in particular reduced density drilling fluids, in lifting and conveying rock cuttings to the surface.

Embodiments of the drilling fluid composition may optionally include from about 0.01 wt % to about 7.0 wt % viscosifier based on the weight of the drilling fluid composition. In other embodiments, drilling fluid composition may optionally include from 0.01 wt % to 6.5 wt %, from 0.01 wt % to 5.0 wt %, from 0.01 wt % to 4.0 wt %, from 0.01 wt % to 3.0 wt %, from 0.05 wt % to 5.5 wt %, from 0.05 wt % to 4.0 wt %, from 0.05 wt % to 3.0 wt %, from 0.05 wt % to 2.0 wt %, from 0.1 wt % to 5.0 wt %, from 0.1 wt % to 4.5 wt %, from 0.1 wt % to 4.0 wt %, from 0.3 wt % to 4.0 wt %, from 0.3 wt % to 3.5 wt %, or from 0.5 wt % to 3.0 wt % viscosifier, based on the total weight of the drilling fluid composition. Unless otherwise stated, the weight percent of an additive in the drilling fluid composition is based on the weight of the drilling fluid composition. In one or more embodiments, the aqueous-based fluid may comprise one or more viscosifiers in an amount that ranges from about 0.1 to about 20 ppb. For example, the drilling fluid may contain the one or more viscosifiers in an amount ranging from a lower limit of any of 0.1, 1, 3, 5, 8, 10, 12, 15, and 17 ppb to an upper limit of any of 5, 7, 10, 12, 14, 16, 18, and 20 ppb, where any lower limit can be used in combination with any mathematically-compatible upper limit.

The drilling fluid composition may include at least one pH adjuster. In embodiments, the drilling fluid composition may optionally include at least one alkali compound. Examples of alkali compounds may include, but are not limited to, lime (calcium hydroxide, calcium oxide, or a mixture of both), soda ash (sodium carbonate), sodium hydroxide, and potassium hydroxide, or other strong bases, or combinations of these alkali compounds. The alkali compounds may react with gases, such as $CO_2$ or $H_2S$, encountered by the drilling fluid composition during drilling operations to prevent the gases from hydrolyzing components of the drilling fluid composition. Some example drilling fluid compositions may optionally include from about 0.01 wt % to about 0.7 wt % soda ash. In other embodiments, the drilling fluid composition may optionally include from 0.01 wt % to 0.5 wt %, from 0.01 wt % to 0.3 wt %, from 0.01 wt % to 0.1 wt %, from 0.01 wt % to 0.05 wt %, from 0.05 wt % to 0.7 wt %, from 0.05 wt % to 0.5 wt %, from 0.05 wt % to 0.3 wt %, from 0.05 wt % to 0.1 wt %, from 0.1 wt % to 0.7 wt %, from 0.1 wt % to 0.5 wt %, from 0.1 wt % to 0.3 wt %, from 0.3 wt % to 0.7 wt %, from 0.3 wt % to 0.5 wt %, or from 0.5 wt % to 0.7 wt % pH adjuster, based on the total weight of the drilling fluid composition. Some example drilling fluid compositions may optionally include from about 0.01 ppb to about 10 ppb of at least one pH adjuster, based on the total volume of the drilling fluid composition.

In one or more embodiments, the drilling fluid may have a pH ranging from 5, 5.5, 6, 6.5, 7, 7.5, 8, 8.5, 9, 9.5, and 10 to 6, 6.5, 7, 7.5, 8, 8.5, 9, 9.5, 10, 10.5, 11 and 12, where any lower limit may be combined with any mathematically feasible upper limit.

One or more embodiments of the present disclosure additionally relate to methods of producing an anti-bit balling drilling fluid. The produced drilling fluids may be in accordance with any of the embodiments previously described. The method may include mixing water, and an epoxidized α-olefin anti-bit balling additive, and one or more drilling fluid additives in accordance with any of the embodiments previously described.

In some embodiments, the mixture may be mixed at a shear speed of from about 300 rotations per minute (RPM) to about 11500 RPM, such as from 300 RPM to 600 RPM, or from 600 RPM to 900 RPM. The mixture may be sheared, such as at 10000 RPM, for from 10 minutes to 100 minutes, such as from 10 minutes to 15 minutes, or from 20 minutes to 40 minutes, or from 60 minutes to 80 minutes.

One or more embodiments of the present disclosure may also relate to method for using the drilling fluid in drilling operations. The drilling fluid may be in accordance with any of the embodiments previously described. In some embodiments, the drilling fluid may be introduced into wellbore, the drilling fluid composition comparing the components as previously described. In some embodiments, the drilling fluid may be introduced through a drill string, traverse through a drill bit into the wellbore, and then recirculate back up to the surface through the annulus formed between the wellbore wall and the drill string.

Recirculating the fluid may allow the drilling fluid to cool and lubricate the drill bit and to lift rock cuttings away from the drill bit, carrying the cuttings upwards to the surface to clean the drill bit and the wellbore. The drilling fluid may additionally reduce the accumulation of cuttings on the drill bit, which can slow and even stop the drill bit from properly performing.

Examples

The following examples are merely illustrative and should not be interpreted as limiting the scope of the present disclosure.

The effectiveness of epoxidized α-olefin as anti-bit balling additive was determined by performing accretion tests with water based drilling fluids. Accretion test were designed and executed to determine the accretion and anti-agglomeration tendencies of a drilling fluid where the fluid is a water-based mud.

The anti-bit balling drilling fluids of the present disclosure may have improved anti-bit balling characteristics over conventional drilling fluids. As demonstrated in the following Examples, the improved characteristics of the anti-bit balling drilling fluids are associated with the epoxidized α-olefin anti-bit balling drilling fluid additive.

The accretion properties of several sample fluids were tested to compare drilling fluids of the present embodiments with conventional drilling fluids that did not contain the embodiment anti-bit balling additive. Three formulations were tested. Two comparative examples and one example were prepared in accordance with one or more embodiments previously described.

Three different water based drilling fluids were formulated for this study. The three formulations are given in Table 1. Comparative Example 1 was formulated without any anti-bit balling additive and is referred to as the "base" drilling fluid. Example 2 was formulated with 0.57 wt % (2 ppb) Vikolox® 14. Vikolox® 14 is the epoxidized α-olefin with a chemical formula $C_{14}H_{28}O$. The chemical structure of Vikolox® 14 is exemplified in formula (I), where x is 11. Comparative Example 3 was prepared in the same manner as Comparative Example 1 and Example 2 but with a conventional commercial anti-bit balling additive, which is an ester lubricant, substituted in place of the anti-bit balling additive of one or more embodiments of the present disclosure. The composition of each formulation is listed in Table 1. The composition was prepared by continuous mixing using a Hamilton Beach Model HMD 400 mixer at 11500 RPM shear. The time each component was added to the mixture is also listed.

TABLE 1

| Example Formulations | | | | |
|---|---|---|---|---|
| | Mixing time, (min) | Comparative Example 1 | Example 2 | Comparative Example 3 |
| water | | 308 ppb | 308 ppb | 308 ppb |
| XC polymer | 15 | 0.1 ppb | 0.1 ppb | 0.1 ppb |
| PAC-R ™ | 15 | 0.5 ppb | 0.5 ppb | 0.5 ppb |
| lime | 10 | 0.5 ppb | 0.5 ppb | 0.5 ppb |
| CaCO3(fine) | 5 | 35 ppb | 35 ppb | 35 ppb |
| Calibrated bentonite | 5 | 15 ppb | 15 ppb | 15 ppb |
| RevDust[3] ™ | 5 | 5 ppb | 5 ppb | 5 ppb |
| Anti-bit balling additive | 5 | — | 2 ppb Vikolox ® 14 | 2 ppb Commercial anti-bit balling additive |
| Defoamer | | As required | As required | As required |

[3]RevDust, calcium montmorillonite clay, commercially available from Milwhite, Inc (Brownsville, TX)

To demonstrate the results of the accretion tests, observations were recorded of the accretion tube both before and after the rod was hot rolled in the test cell with the drilling fluid.

The experiments were conducted by first measuring the weight of a bare rod to the nearest gram and comparing the weight of the rod prior to hot rolling in the prepared drilling fluid with the weight of the rod after it was removed from the hot rolling cell.

For each of the three formulations, the drilling fluid was prepared. A pre-weighed Monel® nickel alloy accretion tube was added to the respective drilling fluid formulation. The drilling fluid and accretion tube were hot rolled at 150° F. for 4 hours in a hot rolling cell pressurized to 100 psi. The rod was then removed and set on a screen for the mud to drain for ten seconds prior to being re-weighed. The weight of the mud remaining on the rod was determined by subtracting the final weight from the initial weight of the dry rod. The resulting accretion percentages are provided in Table 2 for further comparison.

TABLE 2

| Accretion values after performing the accretion tests. | | | |
|---|---|---|---|
| Additive | Comparative Example 1 | Example 2 | Comparative Example 3 |
| % Accretion | 13.08 | 3.89 | 5.59 |

The Comparative Example 1 was shown to have a % accretion value of 13.08 while Example 2 and Comparative Example 3 showed % accretion values of 3.89 and 5.59, respectively. These results show that epoxidized α-olefin was more effective than the commercially available conventional commercial anti-bit balling additive in reducing the accretion of the drilling fluid on the Monel® metal tube, which is a good proxy for the typical materials used downhole.

The presently disclosed systems, apparatuses, methods, processes and compositions may suitably comprise, consist, or consist essentially of, the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which these systems, apparatuses, methods, processes and compositions belong.

The singular forms “a,” “an,” and “the” include plural referents, unless the context clearly dictates otherwise.

As used here and in the appended claims, the words “comprise,” “has,” and “include” and all grammatical variations thereof are each intended to have an open, non-limiting meaning that does not exclude additional elements or steps.

When either words “approximately” or “about” are used, this term may mean that there can be a variance in value of up to ±10%, of up to 5%, of up to 2%, of up to 1%, of up to 0.5%, of up to 0.1%, or up to 0.01%.

The term “substantially” as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

“Optionally” means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A drilling fluid composition comprising:

an aqueous-based fluid;

one or more drilling fluid additives; and an anti-bit balling additive, wherein the anti-bit balling additive is an epoxidized α-olefin that has the general structure of Formula (I):

Formula (I)

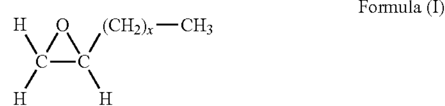

wherein x is in a range from 1 to 40, and wherein the anti-bit balling additive is included in the drilling fluid in an amount ranging from 1.0 percent by weight (wt %) to 7.0 wt %.

2. The drilling fluid composition of claim 1, wherein the aqueous-based fluid of the drilling fluid comprises greater than 70 wt % (weight percent) of the drilling fluid.

3. The drilling fluid composition of claim 2 where the aqueous-based fluid is a brine.

4. The drilling fluid composition of claim 1, wherein the epoxidized α-olefin of claim 1 is linear, branched, unbranched, substituted, unsubstituted, or a combination thereof.

5. The drilling fluid composition of claim 1, wherein the drilling fluid additive is one or more additives selected from the group consisting of fluid loss control agents, lost circulation control agents, supplemental weighting agents, fluid loss additives, viscosifiers, an alkali reserve, pH adjuster, shale inhibitors, and a combination thereof.

6. The drilling fluid composition of claim 5, wherein drilling fluid composition comprises one or more drilling fluid additives in an amount ranging from 1 to 30 wt %.

7. The drilling fluid composition of claim 5, wherein the additive is a weighting agent and wherein the weighting agent is comprised in an amount ranging from 1 to 20 wt %.

8. The drilling fluid composition of claim 1, where a % accretion of the drilling fluid is less than 12%.

9. A method for using a drilling fluid comprising:

introducing a drilling fluid composition, comprising an aqueous-based fluid, an anti-bit balling additive, and one or more drilling fluid additives, into a wellbore, wherein the anti-bit balling additive is an epoxidized α-olefin that has the general structure of Formula (I):

Formula (I)

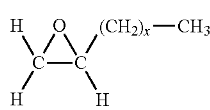

wherein x is in a range from 1 to 40, and wherein the anti-bit balling additive is included in the drilling fluid in an amount ranging from 1.0 percent by weight (wt %) to 7.0 wt %.

10. The method of claim 9, wherein introducing the drilling fluid comprises at least partially circulating the drilling fluid through the drill bit.

11. The method of claim 10, wherein the aqueous-based fluid of the drilling fluid comprises greater than 70 wt % (weight percent) of the drilling fluid.

12. The method of claim 11, where the aqueous-based fluid is a brine.

13. The method of claim 9, wherein the epoxidized α-olefin is linear, branched, unbranched, substituted, unsubstituted, or a combination thereof.

14. The method of claim 9, wherein the drilling fluid has an accretion percentage of less than or equal to 12%.

15. The method of claim 9, wherein the drilling fluid additive is one or more additives selected from the group consisting of fluid loss control agents, lost circulation control agents, supplemental weighting agents, fluid loss additives, viscosifiers, an alkali reserve, pH adjuster, and a combination thereof.

16. The method of claim 15, wherein drilling fluid comprises one or more drilling fluid additives in an amount ranging from 1 to 30 wt %.

17. A method for making a drilling fluid comprising:

mixing an aqueous base fluid with one or more drilling fluid additives and an anti-bit balling additive, wherein the anti-bit balling additive is an epoxidized α-olefin that has the general structure of Formula (I):

Formula (I)

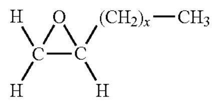

wherein x is in a range from 1 to 40, and wherein the anti-bit balling additive is included in the drilling fluid in an amount ranging from 1.0 percent by weight (wt %) to 7.0 wt %.

18. The method of claim 17, wherein the aqueous-based fluid of the drilling fluid comprises greater than 70 wt % (weight percent) of the drilling fluid.

19. The method of claim 17, wherein the aqueous-based fluid is a brine.

20. The method of claim 17, wherein the epoxidized α-olefin is linear, branched, unbranched, substituted, unsubstituted, or a combination thereof.

* * * * *